United States Patent [19]

Fox et al.

[11] Patent Number: 5,264,194
[45] Date of Patent: Nov. 23, 1993

[54] RESTORING REACTIVITY OF GAS SWEETENING OXIDE BEDS

[76] Inventors: Irwin Fox, 37 Meadowbrook Country Club Estates, Ballwin, Mo. 63011; Alvin Samuels, 444 Fairway Dr., New Orleans, La. 70124

[21] Appl. No.: 878,031

[22] Filed: May 4, 1992

Related U.S. Application Data

[63] Continuation-in-part of Ser. No. 568,181, Aug. 16, 1990, abandoned, and a continuation-in-part of Ser. No. 400,379, Aug. 30, 1989, abandoned, and a continuation-in-part of Ser. No. 498,412, Mar. 26, 1990, abandoned, and a continuation-in-part of Ser. No. 613,857, Dec. 14, 1990, abandoned.

[51] Int. Cl.$^5$ .............................................. C01B 17/16
[52] U.S. Cl. .................................. 423/231; 423/242.1; 423/244.01; 423/244.02; 423/244.03; 423/244.1
[58] Field of Search .................. 502/84, 87; 423/231, 423/244 A, 244 R, DIG. 5, 242.1, 244.01, 244.02, 244.03, 244.1

[56] References Cited

U.S. PATENT DOCUMENTS

| | | | |
|---|---|---|---|
| 1,816,533 | 7/1931 | Huff et al. | 423/231 |
| 4,142,994 | 3/1979 | Alafandi | 252/450 |
| 4,246,244 | 1/1981 | Fox | 423/225 |

FOREIGN PATENT DOCUMENTS 1243805  7/1986  U.S.S.R.

*Primary Examiner*—Gary P. Straub
*Assistant Examiner*—Timothy C. Vanoy
*Attorney, Agent, or Firm*—Jerome A. Gross

[57] ABSTRACT

Non-hydrated iron oxides utilized in moistened permeable beds to react hydrogen sulfide present in natural gas do not totally lose their reactivity when the beds give up their moisture to dry gas. Lessening of their reactivity attendant to dryness is signalled by a rise in $H_2S$ level in the gas at or somewhat in advance of the reactor outlet. On such signal water is injected into the inflowing gas stream, reviving the bed's reactivity and permitting continuation of gas sweetening until the reactive potential of the oxide is substantially fully utilized, with minimal water addition.

8 Claims, No Drawings

RESTORING REACTIVITY OF GAS SWEETENING OXIDE BEDS

CROSS-REFERENCE TO RELATED APPLICATIONS

The present invention is a continuation-in-part of U.S. patent application Ser. No. 07/568,181, filed Aug. 16, 1990, entitled "Restoring Reactivity of Gas Sweetening Oxide Beds", abandoned on Jun. 1, 1992, and is also a continuation-in-part of the following succession of related applications: U.S. patent application Ser. No. 07/400,379, filed Aug. 30, 1989, entitled "Disposable Oxide and Carrier for Gas Stream Purification," and of U.S. patent application Ser. No. 07/498,412, filed Mar. 26, 1990, having same title, both now abandoned in favor of a application entitled "Disposable Oxide Carrier for Scavenging Hydrogen Sulfide," Ser. No. 07/613,857, filed Dec. 14, 1990 and abandoned on 4 May 4, 1992.

BACKGROUND OF THE INVENTION

1. Field of the Invention

This invention relates to the use of non-hydrated iron oxides in permeable beds for reacting hydrogen sulfide from relatively dry gas, with minimal added moisture to maintain reactivity, and to restoring the beds to full reactivity after the bed moisture has been used up.

2. Description of Related Art

In removing hydrogen sulfide from natural gas by reacting with iron oxides, it is known from field experience that $H_2O$ must be present. The gas produced by most wells contains adequate water vapor. However, premature loss of oxide reactivity may occur in at least the following situations:

1. Where, atypically, the gas is so lacking in moisture as to be considered "under-saturated"; and especially 2. Where relatively dry gas is greatly chilled before being reacted, to remove those heavier hydrocarbons likely to form droplets in the outlet gas; as these are removed by chilling, it precipitates the water vapor as well.

In reacting hydrogen sulfide in gas by flowing it through a permeable bed, the iron oxide heretofore conventionally used in the bed is the hydrated oxide $Fe_2O_3 \times H_2O$. In the well-known wood chip process, a pervious bed of moistened wood chips is formed, through which this hydrated oxide is intermixed. In use, when substantially dry gas flows through the bed of oxide and moistened wood chips after the bed's moisture has dried, the water of hydration incorporated in the oxide will dry also, suddenly rendering the oxide incapable of reacting further. Adding water to the bed at this stage serves no function; the reactivity of the oxide has been destroyed. The sweetening process is then at a halt, the old bed must be removed from the reactor vessel, and a new bed of reactive material provided. If at this time a substantial portion of the reactive capacity of the $Fe_2O_3$ has been utilized, it will have solidified or "cemented" the bed, making its removal difficult and time-consuming.

To avoid premature shut-down of the sweetening process, water has been precautionarily added to the inflowing gas throughout the process, in amounts which are more than necessary to continue the reactivity of the oxide. Such excess water must be removed downstream, adding to the expense and complexity of the process.

SUMMARY OF THE INVENTION

The special oxide described in U.S. Pat. No. 4,324,298, which comprises amorphous $Fe_2O_3$ and crystalline $Fe_3O_4$ or $Fe_2O_3$, is not a hydrated oxide. When this oxide and water are together mixed into porous bed material (preferably the calcined montmorillonite particles of our co-pending patent application above referred to, and provided as a pervious bed in a conventional reactor vessel, the water utilized in moistening these particles, so that the oxide will adhere thereto, serves initially as the water whose presence is necessary to carry out the reaction process. If this water is exhausted by dry gas, conventional monitoring of gas from the reactor vessel will reveal, not termination of the reactive capacity of the bed, but instead merely that it has become dry and the dryness is limiting its reactivity. Without stopping the flow of gas, water is then injected into the gas inflow, restoring the reactivity of the system. The reactor gas may be monitored for breakthrough of $H_2S$ by sampling at the reactor outlet or at one or more sampling ports in advance of the outlet of the reactor vessel.

Thus, in contrast to hydrated iron oxides whose reactivity is destroyed when their water of hydration has been dryed up; the reactivity of non-hydrated oxides is restored when water addition is commenced. The present use of reactive non-hydrated oxide utilizes its reduced reactivity, and attendant break-through of $H_2S$, to signal the need for added water.

These favorable consequences flow from the present invention:

1. There is no need to discontinue the run through the reactor to clear out and replace the bed; the reactive capacity of the oxide is substantially fully utilized, and this without cementing the bed.

2. There is no need to add excess water to the inflowing gas to avoid such a breakdown as occurs when a hydrated iron oxide is used in reacting dry gas. Hence, the expense of downstream removal of such excess water is at least greatly reduced.

DESCRIPTION OF THE PREFERRED EMBODIMENTS

In each of the examples which follow, the non-hydrated iron oxide described in U.S. Pat. No. 4,246,244 was used, intermixed in presence of moisture with the described porous calcined montmorillonite carrier. These materials are preferred because of their proven reliability, their ease of clean-out from the reactor vessel after being fully reacted, and the fact that when reacted they are stable and may be disposed of without hazard to the environment. They are subject to the copending patent application hereinabove mentioned, and may be obtained from Gas Sweetener Associates, Inc., St. Louis, Mo., under the trademark "SULFATREAT," already intermixed in the following percentages:

|  | % |
|---|---|
| Montmorillonite, calcined | 59 |
| Oxide | 22 |
| Water | 18 |
| Sodium sulfite | 1 |

| | % |
|---|---|
| | 100 |

The present invention may advantageously be used either when the gas is to be reacted in a single reactor vessel or by two vessels connected in series. In either case, the gas may first be flowed through a chiller (which will precipitate some of the heavier hydrocarbon gases but also water vapor) and a heater, as in conventional practice.

Using a pervious bed constituted of "SULFA-TREAT" as set forth in a system having a single reactor tower, when the $H_2S$ level, monitored by sampling at or in advance of the reactor outlet, shows a sudden rise, water is injected into the inflowing gas. The amount injected may be relatively small; the drop in the $H_2S$ level which follows signals that the bed has been revived. Thereafter, such small amounts of water are injected, either continuously or at intervals, to avoid recurrence of increase in $H_2S$. This is continued until the known capacity of the oxide is substantially (say at least three-fourths) utilized.

When a single reactor vessel is utilized, the vessel may advantageously be equipped with at least one sampling port, either at mid-depth of the vessel or somewhere between mid-depth and the reactor outlet.

While experience at some installations has shown that unusually dry gas may dry reactor beds within as little as seven days, at other installations (where the gas is fairly moist and not heavily polluted with $H_2S$), the same may flow for a year or more without drying the bed or exhausting its reactive capacity. To lessen the need for frequent sampling for $H_2S$, at the outlet, less frequent sampling at such a sampling port in advance of the gas outflow, will give either (a) advance warning of a potential $H_2S$ break-through so that water may be added to prevent a break-through; or (b) reasonable assurance (considering the quantity of gas, which has been purified, without $H_2S$ break-through at the sampling port) that bed use may be continued without either water addition or frequent sampling. Again, it may be reasoned that if say three-fourths or more of the bed's reactive capacity has been utilized, practical considerations may suggest shut-down and replacement of the bed.

Two reactor vessels may be used through which the gas flows in series. In such a series system, the $H_2S$ outlet levels of both reactors are to be monitored; the second for increase above the legal or other desired maximum, and the first for determining when this reactor is no longer performing its anticipated share of $H_2S$ reduction. Should the $H_2S$ level of either reactor be higher than predicted, this would indicate the need for water injection; otherwise, reduced reactive capacity would result. As water is injected, it revives the capacity of either or both reactors.

The reaction speed is a function of the $H_2S$ concentration, the rate constant and the reactive oxide loading. The rate constant itself is exponentially proportionate to the water content of the reactor bed. During a typical run without water, the rate constant was as low as $0.34 \times 10^{-4}$. The addition of water increased this rate constant to $6.2 \times 10^{-4}$; it lessened the bed height required for sweetening from 15 feet to six feet. This increased reaction rate is evidenced by greater $H_2S$ removal efficiency, as seen in the tabular summaries of three consecutive test referred to hereafter as (a) (b) and (c).

The following is a comparison of three tests conducted consecutively at a reactor system including two down-flow reactor towers through which the gas is flowed in series after first flowing through a conventional chiller and an inlet heater. The $H_2S$ levels were monitored at the reactor outlet in these tests. Only in test (c) was water injection employed; and only in it was the reactive capacity of the oxide fully utilized.

The reactors utilized and operating conditions were as follows:

| Reactor Dimensions: | |
|---|---|
| Inner Diameter (inches) | 44 |
| Bed Height (ft.) each tower | 18.48 |
| Pack of Bed Material (lbs.) | 13649 |
| Specified Outlet $H_2S$, PPM (from second tower) | 4.0 |

A brief tabular summary of the three test runs is shown below.

| | (a) | (b) | (c) |
|---|---|---|---|
| MMSCFD* | 1.685 | 1.843 | 1.677 |
| $H_2S$, ppm | 271 | 270 | 279 |
| Temperature, °F. | 129 | 120 | 116 |
| Pressure, psig. | 214 | 302 | 208 |
| Bed Material, Loading, Lbs/Tower | 13650 | 13650 | 13650 |

*Flow Rate in millions of standard cu.ft./day

The gas stream was exceptionally dry, as shown below:

Water Content of Gas

Inlet Gas After Chiller 300 psi—0° F.(saturated) 5 lbs/mmscf

After Reactor System 300 psi—100° F.(potential) 160 lbs/mmscf

The increase in the gas' water absorbing capacity, in processing subsequent to chilling, accounts for its absorption of water from the bed. The three tests progressed according to the following table, which shows the $H_2S$ in the inlet gas, and at the outlet of the first tower, and at the outlet of the second tower. Water was added only during test run (c) when the $H_2S$ at the outlet of the first reactor rose substantially, from 30 ppm to 110 ppm. Each of the test runs called for discontinuance after the $H_2S$ outlet level of the second reactor exceeded 4 ppm, the specified maximum.

| | $H_2S$ Present During Test Runs Two-Tower System $H_2S$ Levels (ppm.) | | | | | | | |
|---|---|---|---|---|---|---|---|---|
| | Test Run (a) | | | Test Run (b) | | | Test Run (c) | |
| | Inlet | Outlets of | | Inlet | Outlets of | | Inlet | Outlets of |
| Day | Gas | #1 | #2 | Gas | #1 | #2 | Gas | #1 | #2 |
| 1 | 270 | 0 | 0 | 270 | 15 | 0 | 250 | 0 | 0 |
| 2 | 260 | 10 | 0 | 270 | 20 | 0.2 | 300 | 20 | 0 |
| 3 | | | | 270 | 120 | 0 | 310 | 30 | 0 |
| 4 | | | | | | | 300[1] | 110 | 0 |
| 6 | 270 | 18 | 3 | 270 | 130 | 0 | 310 | 120 | 0 |
| 9 | 290 | 30 | 0 | | | | 310[2] | 110 | 0 |
| 11 | 290 | 100 | 0 | 270 | 145 | 7 | 300 | 85 | 0 |
| 12 | 280 | 150 | 0.2 | | | | | | |
| 14 | | | | | | | 270 | 100 | 0 |
| 18 | 270 | 200 | 7 | | | | 280 | 125 | 0 |
| 26 | | | | | | | 260 | 125 | 0.1 |

-continued

| | H₂S Present During Test Runs Two-Tower System H₂S Levels (ppm.) | | | | | | | |
|---|---|---|---|---|---|---|---|---|
| | Test Run (a) | | | Test Run (b) | | | Test Run (c) | |
| | Inlet | Outlets of | | Inlet | Outlets of | | Inlet | Outlets of |
| Day | Gas | #1 | #2 | Gas | #1 | #2 | Gas | #1 | #2 |
| 29 | | | | | | | 260 | 125 | 2 |
| 31 | | | | | | | 260 | 125 | 14 |

¹commenced water injection 45 gal. per day
²slowed water injection to 25 gal. per day In tests (a) and (b) the lives of the reactor beds to outlet gas excess over 4 ppm were only 18 and 11 days, respectively, as compared with approximately 30 days for test (c). In test (c), the fourth day rise in H₂S outlet level from the first tower—from 30 ppm to 110 ppm—signaled a state of dryness; rise above this level was substantially prevented by water injection of 45 gallons per day, promptly reduced to 25 gallons per day. As the result, this test run continued for 31 days.

For purpose of these tests, the reactor vessels were equipped with sampling ports at the 3', 6', 9', 12' and 18' levels. While the results above tabulated include H₂S levels at the reactor outlets only, the most obvious indication of increased reaction rate due to water injection was this: by it the H₂S level in the downflowing gas from the outlet tower was reduced from 5 ppm at the 15' depth to 5 ppm at the 9' depth, six days later. This decrease of bed height required provides direct confirmation of bed restoration by the water addition: the speed of reaction was increased from $0.34 \times 10^{-4}$ before water injection, to $6.2 \times 10^{-4}$ after water injection.

While this specification mentions the use of either a single reactor or two reactors in series, it is applicable to a larger plurality of reactors also.

Various other modifications may be made in the procedures herein described without departing from the scope of the invention; accordingly, all matter contained in the foregoing description shall be taken as illustrative rather than limiting.

We claim:

1. A method for scavenging hydrogen sulfide in natural gas using a packed bed, the gas being of such dryness as would remove moisture from the packed bed, and for keeping the level of H₂S in the outlet gas within a maximum limit, said method using an iron oxide reactive to hydrogen sulfide and having no water of hydration and comprising the steps of:
   a. preparing in a reactor vessel a gas-permeable packed bed comprising a non-reactive particulate carrier insoluble in water on whose surfaces are moisture-adhered particles of said iron oxide, the bed being otherwise substantially dry, then
   b. directing inflow of said natural gas into and through said packed bed and monitoring such gas from said reactor for an increase in H₂S level, and without interrupting such inflow,
   c. on occurrence of a substantial increase in the H₂S gas level in the outlet gas, adding to the inlet gas an amount of water to achieve a reduction of the H₂S outlet gas level so that the H₂S level means within the said maximum limit, and
   a. continuing the gas inflow and such additions of water unit the reactive capacity of the non-hydrated oxide is at least three-fourths utilized.

2. The method defined in claim 1 wherein such gas is monitored for an increase in H₂S at the outlet of said reactor vessel.

3. The method defined in claim 1 wherein such gas is monitored for an increase in H₂S at a level in advance of the outlet of said reactor vessel.

4. The method as defined in claim 1, in which the non-hydrated iron oxide consists of amorphous Fe₂O₃ and either crystalline Fe₃O₄ or Fe₂O₃.

5. The method as defined in claim 1, in which the non-reactive particulate carrier is a calcined montmorillonite.

6. A method of operation of a plurality of reactor vessels in series for scavenging hydrogen sulfide from natural gas sufficient to keep the H₂S level in the outlet gas within a maximum limit, the method using a iron oxide which reacts hydrogen sulfide and which has no water of hydration, said method comprising the steps of:
   a. preparing in such reactor vessels, gas-permeable packed beds each comprising a non-reactive particulate carrier insoluble in water on whose surfaces are moisture-adhered particles of said iron oxide, the bed being otherwise substantially dry, then
   b. directing inflow of said natural gas into and through said series reactors,
   c. monitoring the outlet gas from said reactors for an increase in H₂S level, and, without interrupting such inflow,
   d. on occurrences of a substantial increase in H₂S level in the outlet gas from any said reactor, adding to the inlet gas an amount of water to reduce the H₂S outlet level of the said series reactors to within said maximum limit, and
   e. continuing the gas inflow and such additions of water until the reactive capacity of the non-hydrated oxide is at least three-fourths utilized.

7. The method as defined in claim 6, in which the non-hydrated iron oxide is in part amorphous Fe₂O₃ and in part crystalline Fe₃O₄ or Fe₂O₃.

8. The method as defined in claim 6, in which the non-reactive particulate carrier is a calcined montmorillonite.

* * * * *

UNITED STATES PATENT AND TRADEMARK OFFICE
CERTIFICATE OF CORRECTION

PATENT NO.   :   5,264,194
DATED        :   November 23, 1993
INVENTOR(S)  :   Fox, Irwin, et al.

It is certified that error appears in the above-identified patent and that said Letters Patent is hereby corrected as shown below:

Column 6, line 10, "a" should read --d--.

Column 1, line 20, delete the figure "4" at the end of line.

Column 6, line 8, delete "means" and substitute ---remains---

Column 6, line 11, delete "unit" and substitute ---until---.

Signed and Sealed this

First Day of November, 1994

Attest:

BRUCE LEHMAN

*Attesting Officer*          *Commissioner of Patents and Trademarks*